May 1, 1928.
E. O. SCHJOLIN
1,668,517
AIR PRESSURE REGULATOR
Filed June 30, 1926
4 Sheets—Sheet 1
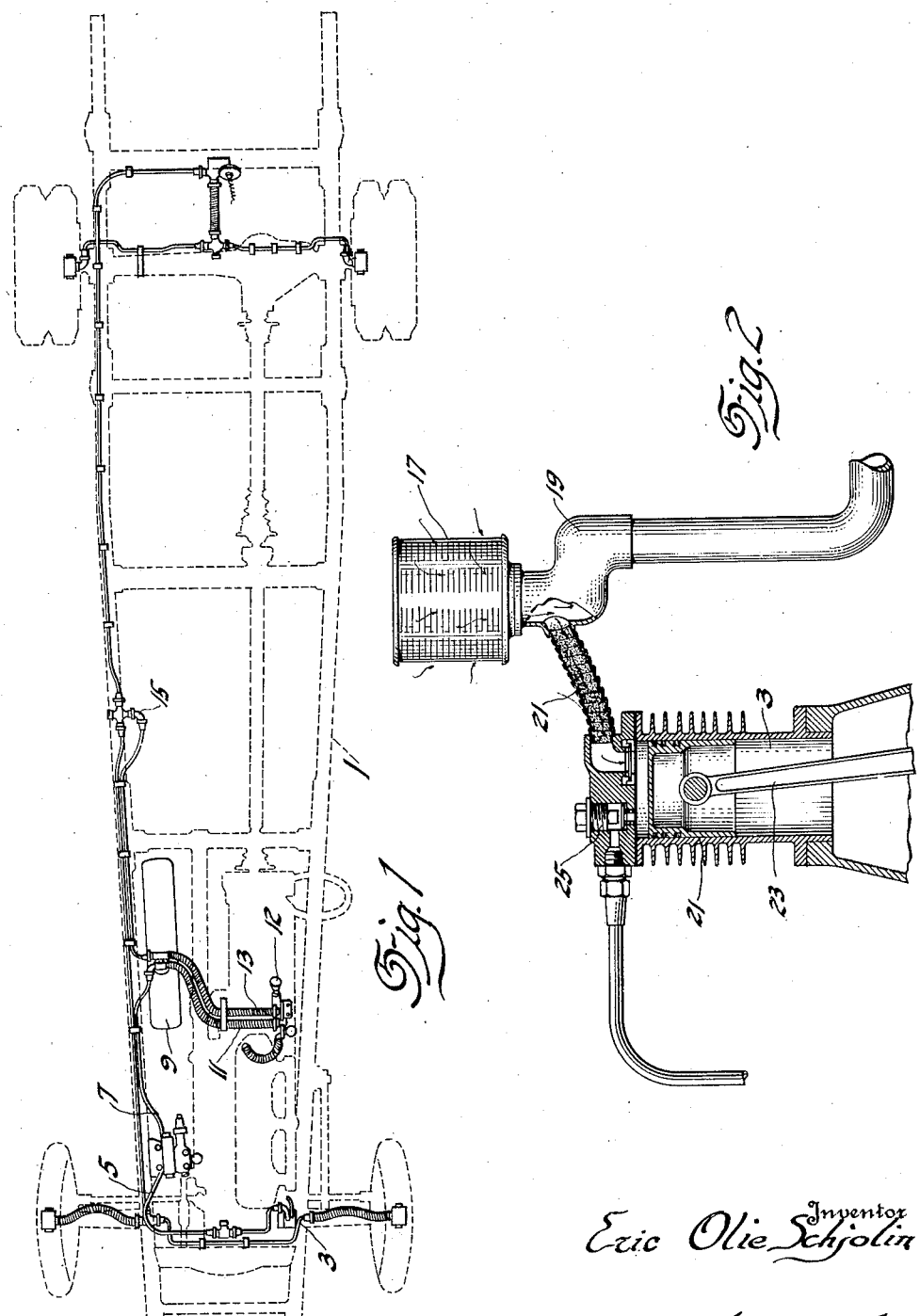

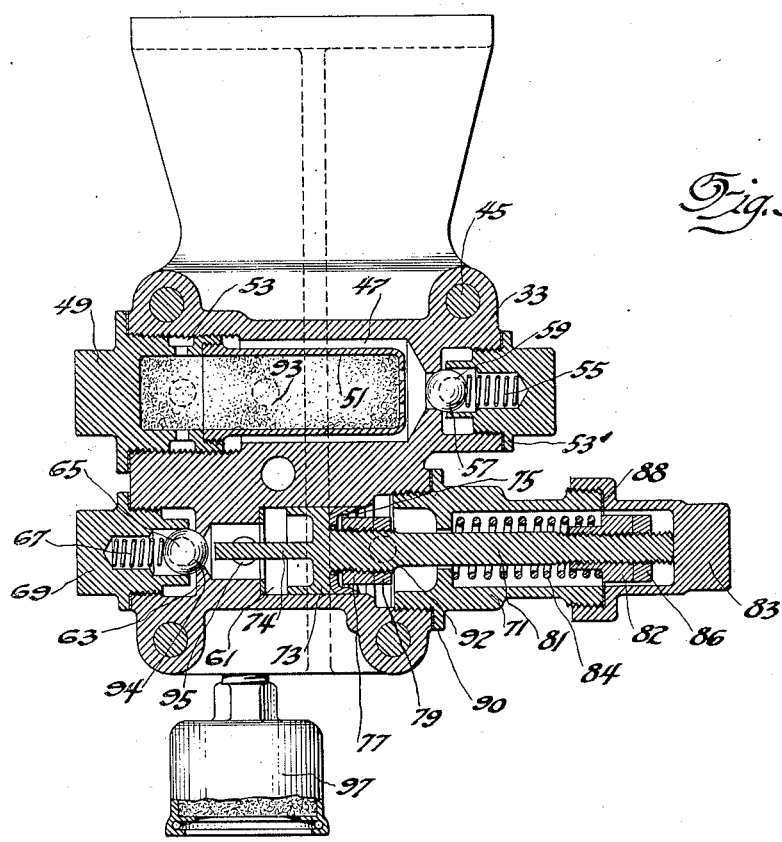
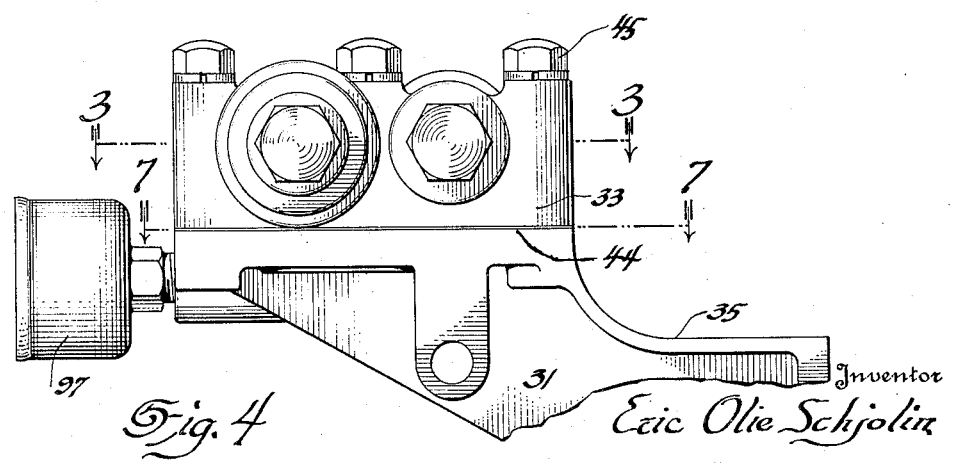

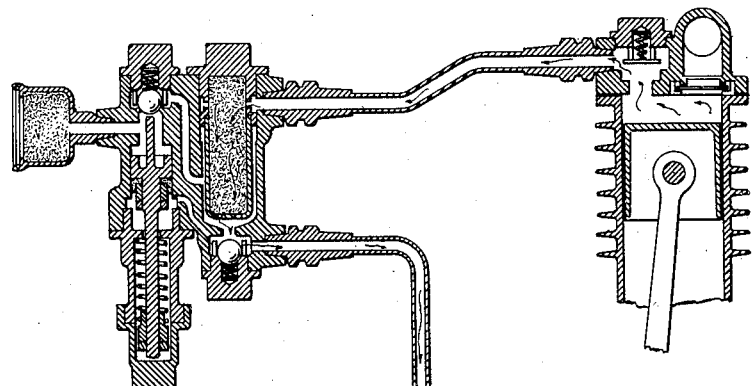
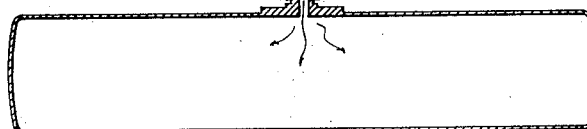
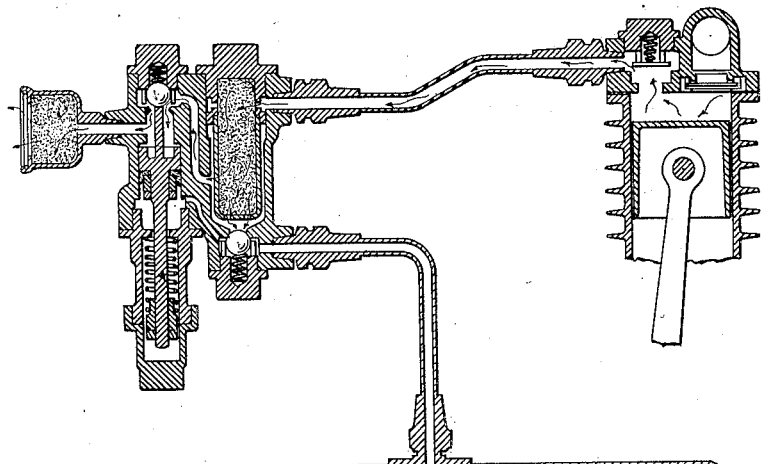

Patented May 1, 1928.

1,668,517

UNITED STATES PATENT OFFICE.

ERIC OLIE SCHJOLIN, OF CHICAGO, ILLINOIS, ASSIGNOR TO GENERAL MOTORS CORPORATION, OF DETROIT, MICHIGAN, A CORPORATION OF DELAWARE.

AIR-PRESSURE REGULATOR.

Application filed June 30, 1926. Serial No. 119,620.

This invention relates to an air brake system intended for use on vehicles similar to that shown and described in my application for air brake system for vehicles, Ser. No. 751,755, filed November 24, 1924.

The present application relates more particularly to an improved air pressure regulator for such a system.

One object of the invention is to locate the air pressure regulator between the air pump and the tank.

A further object is to so construct the regulator that there is incorporated within it an air cleaner.

A further object is to provide for convenient inspection and repair without disconnecting the line connections.

Other objects and advantages will be apparent.

In the drawing accompanying the specification:

Figure 1 is a plan view of the chassis showing my invention installed.

Figure 2 is a vertical sectional view through the air pump used with the brake system.

Figure 3 is a section on line 3—3 of Figure 4 showing the internal details of the pressure regulator.

Figure 4 is a side elevation of the same.

Figures 5 and 6 represent diagrammatically two different positions of the parts within the pressure regulator.

Figure 7:
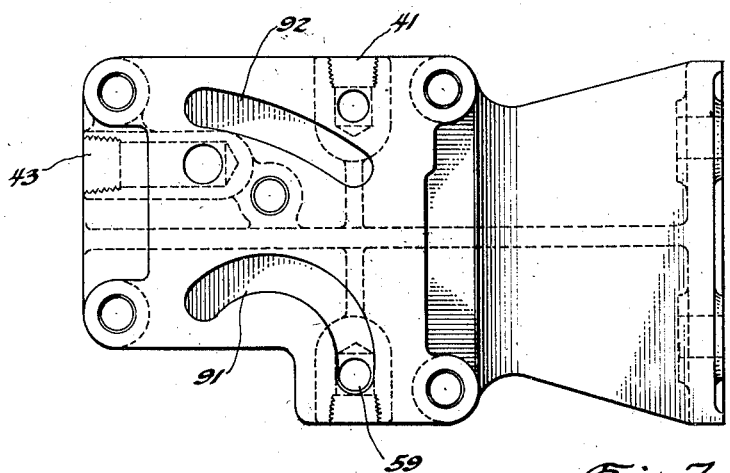
Figure 7 is a plan view on line 7—7 of Figure 4.
Figure 8:
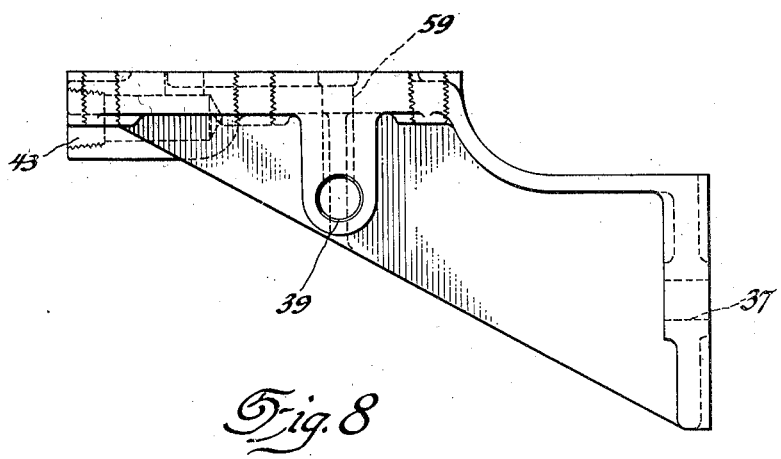
Figure 8 is a side view of the bracket shown in Figure 7.

Referring by reference characters to the drawing, numeral 1 shows in dotted lines a vehicle chassis including the usual frame, wheels, motor and driven parts. The air brake system comprises a pump 3 mounted on the front end of the engine to be driven thereby. The pump is connected by a pipe 5 to the pressure regulator which is more particularly the, subject of this application. From the pressure regulator the pipe 7 extends to the tank 9. From the tank the air is passed through the pipe 11 to a controlling valve 12, more fully described in my prior application referred to. A pipe line 13 carries the air under pressure from the controlling valve to a balanced check valve 15 located on one side of the chassis frame. From the check valve pipe lines extend along the frame to points adjacent the front axle and the middle of the rear axles. At last point another check valve 15 is used from which pipes extend to the brakes at the wheels.

In this application no claim is made for the specific details of the pump. However, an important feature of the invention is the means for ensuring clean air for the system. In Figure 2 is shown at 17 an air cleaner connected by a pipe 19 to the carburetor, not shown. From the pipe 19 extends, at approximately a right angle, a pipe 21 leading to the pump intake valve. This pipe is filled with horse hair. The air passing cleaner 17 may contain some water and some dust particles. The angular relation of pipes 19 and 21 is such that through the action of gravity and inertia the water and dust is, for the most part, kept out of pipe 21. The pump has the usual piston 21 and connecting rod 23, the latter driven in any convenient way from the crank shaft. The air compressed by the pump passes the exhaust valve 25 to the pipe line and the pressure regulator. The pressure regulator comprises a bracket 31 and a valve member 33. The bracket has an arm 35 by which it is to be secured to the chassis frame, openings 37 being provided for the passage of securing members. The bracket has an opening 39 for connection with the pipe to the tank. A second opening 41 for the pipe from the pump and an outlet 43 through which the air from the pump is exhausted when the tank is fully charged, as will be explained. Above the bracket the valve chamber is secured by fastening means 45, a gasket 44 between the bracket and the valve member preventing leakage.

By the arrangement described, it will be noticed that the inlet and discharge connections are made solely with the bracket, and that the valve member may be removed to inspect, clean or to repair internal parts without disturbing the air line connections. It may be added that this feature is incorporated in the other attachments including the brake application valve and the check valves.

The valve member is seen to have two passages. Passage 47 has threaded into one end a plug 49 to which is engaged by threads a cylinder 51 which is to be filled with horse hair for the purpose of removing any foreign matter from the air. The plug 49 has several lateral openings 53 through which the compressed air from the pump enters and passes within the air cleaning cylinder 51.

The purpose of this second cleaning of the air is to remove any particles which may have entered the pump from the first air cleaning process and also to remove any foreign matter such as particles of carbon, which may have been introduced into the air by the pump itself. It is very important that there should be no foreign matter to interfere with the action of the controlling valve mechanism for operating the brakes.

The air cleaned within cylinder 51 passes without the same into passage 47. Into the other end of passage 47 is threaded a plug 53' within which is seated a spring 55 holding the ball valve 57 against a reduced portion of the passage which forms a valve seat. Beneath the ball valve a passage 59 communicates with outlet 39 to the tank. A second passageway 61 is spaced from the first passageway. Near one end of passage 61 is an inner transverse wall 63 forming a seat for ball valve 65. A spring 67 engages said ball valve and holds it against its seat by engaging as an abutment a plug 69 threaded into opening 61. In the other end of passage 61 is threaded an apertured plug 71. A plunger 73 is movably mounted within passage 61. It carries an extension 74 which may engage and lift ball valve 65 for a purpose to be explained. The plunger has a sealing cup 75 held by nuts 77 and 79. The stem 81 of the plunger is guided in an opening of suitable size in plug 71. The end of the stem is threaded and secured thereto is an adjustable abutment 82 for a spring 84. A lock nut 86 is also threaded on stem 81. The spring 84 engages at its other end the part of the plug having the guiding opening. A cap 83 is threaded on the end of plug 71 and gaskets 88 and 90 are used to prevent leakage.

A curved passage 91 is formed in the top of the bracket and affords communication between the passage 59 beneath the ball valve 57 and an opening 92 into the passage 61 on the sealing cup side of the plunger. A second curved passage 92, also, in the top of the bracket communicates by opening 93 with passage 47 and by opening 94 with passage 61 at a point beneath ball valve 65. From passage 61 an opening 95 affords communication with opening 43. At the outlet of opening 43 is a cup 97 which may be filled with horse hair or other like material to prevent the noise of the escaping air.

Air from the pump enters the regulator at 41. It passes through the cylinder filled with horse hair and then by way of the ball valve 57 out through opening 39 to the tank. It will be seen that the tank pressure is communicated by conduit 91 to the passageway 61 beneath the plunger. When the pressure in the tank rises sufficiently the plunger 73 is moved against the resistance of spring 84 and ball valve 65 is lifted from its seat. There is thus permitted a free flow of air through the passage 92 past the ball valve 65 and out through the exhaust opening. In the meantime, obviously, the valve 57 is closed to prevent the escape of air from the tank through passage 92. After the tank pressure is reduced to about eighty pounds by repeated applications of the brake, the spring 84 acts to withdraw the plunger and the ball valve 65 closes. The pump then again charges the tank by way of ball valve 57 up to a predetermined maximum pressure.

For the purpose of determining the pressure at which the change in course of air takes place the threaded engagement of abutment has been provided. Figures 5 and 6 are included in the drawing to show diagrammatically the two positions of the parts of the regulator. Figure 5 shows the clean air being passed on to the tank, the arrows indicate the direction of the air flow. Figure 6 shows the air being exhausted as is the case when the tank is fully charged. It will be understood that when in use, the tank pressure falls the spring will again permit ball valve 65 to close, after which the pump will restore the air tank pressure automatically.

I claim:

1. A pressure regulator for a pump and tank system for fluids combining an air cleaner and a valve arrangement, whereby the air is cleaned and delivered at times to the tank and at other times to an exhaust opening.

2. In combination with an air cleaner and a pipe therefrom to deliver cleaned air, a branch pipe at an angle to said pipe, and an air pump for supplying a tank, the branch pipe communicating with the inlet of said pump.

3. In combination with an air cleaner for supplying clean air to the carburetor of a gas engine, a pipe leading therefrom for connection to said carburetor, a branch pipe extending at an angle to said first pipe, means in said second pipe to arrest the passage of foreign matter, an air pump, the second pipe being connected to the inlet of the air pump.

4. In combination, an air pump, a tank, an air cleaner at the inlet of said pump, and a second air cleaner between said pump and tank.

5. A pressure regulator comprising a member having a chamber, a valve controlled conduit from said chamber to a tank, a second valve controlled conduit from said chamber to an exhaust, means associated with said second mentioned valve and controlled by the pressure on the tank side of said first valve to control the passage of gas through said regulator.

6. A pressure regulator comprising a member having a chamber, means in said chamber to remove foreign matter from air entering said chamber, a valve controlled conduit from said chamber to a tank, a second valve controlled conduit from said chamber to an exhaust opening, means associated with said second mentioned valve and controlled by the pressure on the tank side of the first valve to control the passage of gas through the regulator.

7. A regulator for air pressure lines including a pump and a tank, a regulator having a chamber, a passage from said chamber to the tank, a second passage from said pump to an exhaust opening, a valve for each passage, mechanical means for opening the valve in said second passage under the action of air from the tank side of the first valve, spring means to normally withdraw the mechanical means which opens the second valve.

8. In a fluid pressure regulator, a member having two chambers, the first chamber having an inlet to receive air from the pump and the valved outlet for discharge to the tank, the second chamber having a valve discharge to an exhaust opening and a plunger having an extension to open said second valve, a spring to normally withdraw said plunger from operative position, the regulator having an air passage from beneath the first valve to a portion of said second chamber on the side of the plunger remote from the valve, there being a second air passage from the first chamber communicating with the second chamber by means of said second valve.

9. In a fluid pressure system, a pump, a tank, a pipe line including a regulator between the pump and tank, a chamber in the regulator to receive air from the pump, a valve controlling flow of air from the chamber to the tank, a variable volume chamber in constant communication with said tank, a valve controlled passage from said first chamber to an exhaust opening, means whereby the variation in volume of said variable volume chamber controls the valve in said valve controlled passage.

10. A pump, a regulator, a tank, a conduit affording communication between said parts, a chamber in said regulator to receive fluid from said pump, a check valve between said chamber and the outlet from the regulator to the tank, a passage from said chamber to an exhaust opening, a check valve normally enclosing said passage, a second chamber in constant communication with said tank, one wall of said second chamber being movable, a part movable with said movable wall to at times open said second valve, yielding means effective to move the movable wall in a direction to permit the closing of said valve.

11. A pressure regulator, a chamber therein having an inlet and a valved outlet, a valved conduit from said chamber to a second outlet, a fluid tight variable volume chamber within said regulator, means whereby the variation in said variable volume chamber controls directly one of said valves and the action of the regulator.

In testimony whereof I affix my signature.

ERIC OLIE SCHJOLIN.